United States Patent
Badami et al.

(10) Patent No.: US 9,482,579 B2
(45) Date of Patent: Nov. 1, 2016

(54) SYSTEMS AND METHODS FOR PLANAR TEMPERATURE MEASUREMENT

(71) Applicant: General Electric Company, Schenectady, NY (US)

(72) Inventors: Vivek Venugopal Badami, Niskayuna, NY (US); Daniel Francesco Driscoll, Simpsonville, SC (US); Scott Francis Johnson, Simpsonville, SC (US); Paul Joseph Martin, Ballston Spa, NY (US); Nilesh Tralshawala, Rexford, NY (US); Guanghua Wang, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 558 days.

(21) Appl. No.: 14/016,580

(22) Filed: Sep. 3, 2013

(65) Prior Publication Data

US 2015/0063412 A1    Mar. 5, 2015

(51) Int. Cl.
| | | |
|---|---|---|
| *G01J 5/02* | (2006.01) | |
| *G01J 5/00* | (2006.01) | |
| *F01D 17/08* | (2006.01) | |

(Continued)

(52) U.S. Cl.
CPC ........... *G01J 5/0088* (2013.01); *F01D 17/085* (2013.01); *F01D 25/30* (2013.01); *G01J 5/0014* (2013.01); *F05D 2270/8041* (2013.01); *G01J 2005/0077* (2013.01); *G01J 2005/106* (2013.01)

(58) Field of Classification Search
USPC ........................................ 374/123, 126, 137
See application file for complete search history.

(56) References Cited

U.S. PATENT DOCUMENTS 3,531,934 A * 10/1970 Hope-Gill ................. F02C 3/04
                                                        60/39.17

4,648,711 A    3/1987  Zachary
5,226,731 A    7/1993  Allen (Continued)

FOREIGN PATENT DOCUMENTS

JP    01176922 A  *  7/1989
JP    08015042 A  *  1/1996

(Continued)

OTHER PUBLICATIONS

Suslov et al ("Investigation of Two Dimensional Thermal Loads in a Region Near the Injector Head of a High Pressure Subscale Combustion Chamber" 47th AIAA Aerospace Sciences Meeting, Jan. 2009).*

*Primary Examiner* — Minh Phan
*Assistant Examiner* — Leon W Rhodes, Jr.
(74) *Attorney, Agent, or Firm* — Ernest G. Cusick; Hoffman Warnick LLC (57) ABSTRACT

Various embodiments include systems and apparatuses adapted for detecting two-dimensional turbomachine exhaust temperature. In some embodiments, a system includes a two-dimensional grid sized to mount within an exhaust path of a gas turbomachine, a radiation detection device for detecting radiation emitted from the two-dimensional grid at a plurality of points on the two-dimensional grid, the radiation detection device being mountable proximate the exhaust path and the two-dimensional grid and at least one computing device connected with the radiation detection device, the at least one computing device configured to generate a planar map of the temperature of the exhaust from the gas turbomachine based upon the intensity of the radiation emitted from two-dimensional grid detected at the plurality of points on the two-dimensional grid.

19 Claims, 6 Drawing Sheets

(51) Int. Cl.
  *F01D 25/30* (2006.01)
  *G01J 5/10* (2006.01)

(56) References Cited

U.S. PATENT DOCUMENTS

| | | |
|---|---|---|
| 5,364,186 A | 11/1994 | Wang et al. |
| 5,822,222 A * | 10/1998 | Kaplinsky ............... G01J 5/60 250/316.1 |
| 6,642,720 B2 * | 11/2003 | Maylotte ............ G01N 33/0022 123/676 |
| 8,431,917 B2 | 4/2013 | Wang et al. |
| 8,437,941 B2 * | 5/2013 | Chandler ................ F02C 9/28 290/52 |
| 2009/0285259 A1 * | 11/2009 | Allen .................... G01J 5/0022 374/130 |
| 2013/0197855 A1 * | 8/2013 | Oskam ................. G01M 15/14 702/135 |

FOREIGN PATENT DOCUMENTS

| | | | |
|---|---|---|---|
| JP | 2010019624 A | * | 1/2010 |
| JP | 2011247608 A | * | 12/2011 |

* cited by examiner

SYSTEMS AND METHODS FOR PLANAR TEMPERATURE MEASUREMENT

FIELD OF THE INVENTION

The subject matter disclosed herein relates generally to gas temperature measurement. More specifically, the disclosure provided herein relates to thin filament pyrometry of gas turbine exhaust.

BACKGROUND OF THE INVENTION

There is often a need for improving efficiency and performance of gas turbos or turbomachines while lessening risks associated with exceeding design limits on their hot gas components, for example, buckets and nozzles.

Some conventional pyrometry or temperature measurement systems used for measuring gas turbomachine exhaust employ the use of one or more thermocouples, for example, discrete, single-point thermocouples. Some conventional systems use thermocouples arranged in a circumferential pattern around the interior of an exhaust duct. The thermocouples used in conventional systems generally do not allow for two-dimensional, planar measurements or highly accurate cross sectional measurements of gas turbine exhaust. Therefore, such systems do not allow for precise calculations of planar gas turbine exhaust conditions, therefore characterization of planar temperature measurement, if possible, suffers from limited granularity.

A second drawback of conventional systems is that in cases where greater temperature map resolution is desired, and radial exhaust rakes with multiple measurement thermocouples are installed in the exhaust plenum, significantly higher associated costs and installation time are required. In spite of the higher costs, such systems fail to provide a full planar, two-dimensional temperature map and a detailed planar characterization of turbomachine exhaust temperature. Due to such limitations, turbomachine efficiency and performance often suffer.

BRIEF DESCRIPTION OF THE INVENTION

Various embodiments include systems and apparatuses adapted for detecting two-dimensional, planar turbomachine exhaust temperature.

In some embodiments, a system includes a two-dimensional grid sized to mount within an exhaust path of a gas turbomachine, a radiation detection device for detecting radiation emitted from the two-dimensional grid at a plurality of points on the two-dimensional grid, the radiation detection device being mountable proximate the exhaust path and the two-dimensional grid and at least one computing device connected with the radiation detection device, the at least one computing device configured to generate a planar map of the temperature of the exhaust from the gas turbomachine based upon the intensity of the radiation emitted from two-dimensional grid detected at the plurality of points on the two-dimensional grid.

According to a first aspect of the invention, a system includes a two-dimensional grid sized to mount within an exhaust path of a gas turbomachine; a radiation detection device for detecting radiation emitted from the two-dimensional grid at a plurality of points on the two-dimensional grid, the radiation detection device being mountable proximate the exhaust path and the two-dimensional grid; and at least one computing device connected with the radiation detection device, the at least one computing device configured to generate a planar map of the temperature of the exhaust from the gas turbomachine based upon the intensity of the radiation emitted from two-dimensional grid detected at the plurality of points on the two-dimensional grid.

A second aspect provides a system including a light source for exciting gas molecules in a first two-dimensional plane within an exhaust path of a gas turbo machine; a radiation detection device for detecting one of an intensity of scattered radiation from the gas molecules or an intensity of fluorescence radiation from the gas molecules; at least one computing device connected to the radiation detection device, the at least one computing device configured to perform one of a Filtered Rayleigh Scattering (FRS) analysis or a planar laser induced fluorescence analysis, the computing device further configured to generate a planar map of the temperature of the exhaust from the gas turbo machine based on one of the (FRS) analysis or the planar laser induced fluorescence analysis.

A third aspect provides a computer program product comprising program code embodied in a computer readable storage medium, which when executed, enables a computer system to implement a method for controlling an operating parameter of a gas turbomachine, the method comprising: receiving radiation data from a plurality of points on a rotatable, two-dimensional grid within an exhaust path of the gas turbomachine; creating a planar map of gas turbomachine exhaust temperature using the radiation data; determining a performance parameter based on the planar map; and modifying the operating parameter based on a determination that the performance parameter deviates from a threshold.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not necessarily to scale. The drawings are intended to depict only typical aspects of the invention, and therefore should not be considered as limiting the scope of the invention. It is understood that elements similarly numbered between the figures may be substantially similar as described with reference to one another. Further, in embodiments shown and described with reference to FIGS. 1-6, like numbering may represent like elements. Redundant explanation of these elements has been omitted for clarity. Finally, it is understood that the components of FIGS. 1-6 and their accompanying descriptions may be applied to any embodiment described herein.

DETAILED DESCRIPTION OF THE INVENTION

The subject matter disclosed herein relates generally to temperature detection, for example, pyrometry. More specifically, the disclosure provided herein relates to the use of gas turbine or turbomachine exhaust temperature measurement and planar mapping for use in control and improved efficiency of gas turbines or turbomachines.

Figure 4:
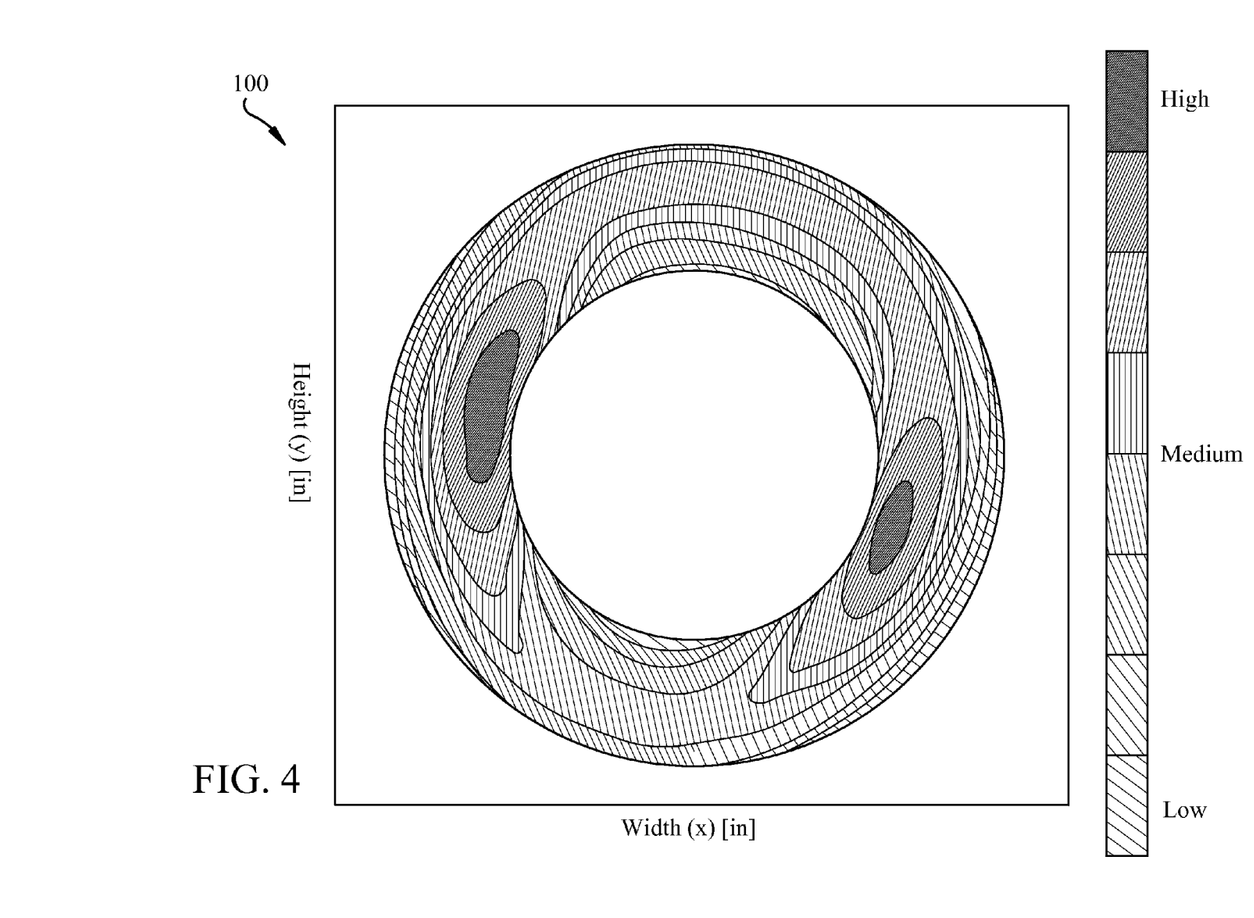
FIG. 4 illustrates a planar temperature map according to embodiments of the invention.

According to aspects, a mesh or grid of filaments may be placed in the exhaust duct of a gas turbine. The mesh or grid may be rotatable and/or translatable, that is, the mesh or grid may not be fixed in place. The material of the filaments may include metal, ceramic or other appropriate material. According to embodiments, the filaments of the mesh or grid are heated by the exhaust gases from the turbomachine and the hot filaments in turn, radiate energy, primarily in the infrared (IR) portion of the electromagnetic spectrum. Aspects include the use of an IR camera as a pyrometer or temperature detection device, while other planar gas temperature measurement technologies (such as Filtered Rayleigh Scattering, Planar Laser Induced Fluorescence, etc.) may also be used to generate a planar map, as shown in FIG. 4. According to aspects, one or more cameras may be mounted near or within the exhaust duct facing the grid of filaments in order to measure the intensity or radiation from the filament on a 2D imaging plane. The camera may detect infrared radiation (IR).

Knowing the emissivity of the thin filaments, temperature maps can be generated in the field of view (FOV) of the camera. Optionally, multi-color pyrometry (MCP) (vs. single-color camera/pyrometry) may be used to remove the temperature measurement uncertainty due to unknown emissivity or changes in emissivity over time.

In general, the 2D temperature measurement of points on a rotating grid may be used to improve granularity of the exhaust plane temperature extrapolation, thereby allowing for improved accuracy of gas turbine efficiency calculations. Further, the planar map may be used to modify an operating parameter of the turbomachine, to improve output or efficiency. The use of the 2D exhaust temperature maps can reduce the uncertainty related to gas turbine firing temperature. When firing temperature is known with high precision, the turbomachine may safely be run at higher firing temperatures, allowing increased output and efficiency. Also, the use of a 2D, planar temperature map may assist in deducing anomalies in combustor can operation via detection of 2D patterns in the exhaust temperature plane, e.g. abnormal inhomogeneity(ies) in the temperature map.

According to aspects, software may be used to automatically segment the 2D image of the grid to isolate the filaments, perform the translation from pixel intensity to temperature, and output a 2D matrix of temperatures in the gas turbine exhaust. When the two-dimensional grid is rotated and the temperature is detected at multiple moving points, the 2D temperature map may be used to enable more accurate exhaust energy measurement, along with a map of greater granularity. Such improvements may lead to more accurate firing temperature estimation for improved control and to improve power output and efficiency of the gas turbomachine.

As indicated herein, problems regarding the thermocouples used in conventional turbomachine exhaust temperature measurement systems generally do not allow for two-dimensional, planar measurements, or highly accurate measurements and mapping of a cross section of gas turbomachine exhaust. Therefore, conventional systems do not allow for precise calculations of the gas turbine exhaust conditions, and accordingly, planar temperature measurement, if possible, suffers from limited granularity.

As differentiated from prior turbomachine exhaust temperature measurement systems, aspects of the invention provide for two-dimensional, high resolution/high granularity planar map of turbomachine exhaust temperature.

According to various aspects described herein, a system including a two-dimensional grid, sized to mount within an exhaust path of a gas turbomachine is disclosed. According to aspects is a radiation detection device for detecting an intensity of radiation emitted of the two-dimensional grid at a plurality of points on the two-dimensional grid, the temperature detection device being mountable proximate the exhaust path and the two-dimensional grid. The temperature detection system may be a pyrometry system, capable of detecting temperature remotely, or without contacting the two-dimensional grid. The pyrometry system may be capable of detecting high temperatures as may be expected to be found in the exhaust path of a gas turbomachine. Aspects of the invention include at least one computing device connected with the temperature detection device. The at least one computing device being configured to generate a planar map of the temperature of the exhaust from the gas turbomachine based upon the temperature of the two-dimensional grid detected at the plurality of points on the two-dimensional grid. The computing device according to aspects may be a general purpose computer adapted to perform the tasks described herein, or the computing device may be a special purpose computer for performing functions involved in monitoring and controlling functions and parameters of the turbomachine. According to some aspects, the computing device is configured to determine a performance parameter of the gas turbomachine based upon the planar map. According to yet further aspects, the computing device may be configured to provide instructions to modify an operating parameter of the gas turbomachine based on the determined performance parameter of the gas turbomachine.

The creation of the planar temperature map via pyrometry or other temperature measurement according to various aspects may be used in a turbine system or in other applications that require such a planar temperature map, or in which a planar map of exhaust temperatures may be of use. Embodiments may include a two-dimensional grid that is adapted to rotate relative to a primary axis of the gas turbomachine and/or adapted to move translationally along a primary axis of the gas turbomachine. In such embodiments, one or more actuators may move the two-dimensional grid and the actuator(s) may be controlled by the computing device. The two-dimensional grid of embodiments may include filaments of metal, ceramic or other appropriate material.

Further, the temperature detection device, according to embodiments, may include an infrared camera and/or a multi-color pyrometry system. The temperature detection system according to aspects may provide appropriate data such that the computing device may perform a Filtered Rayleigh Scattering analysis to create the planar map. Also, according to aspects the temperature detection device may provide data sufficient to allow the computing device to perform a Planar Laser Induced Fluorescence analysis to create the planar map.

Figure 1:
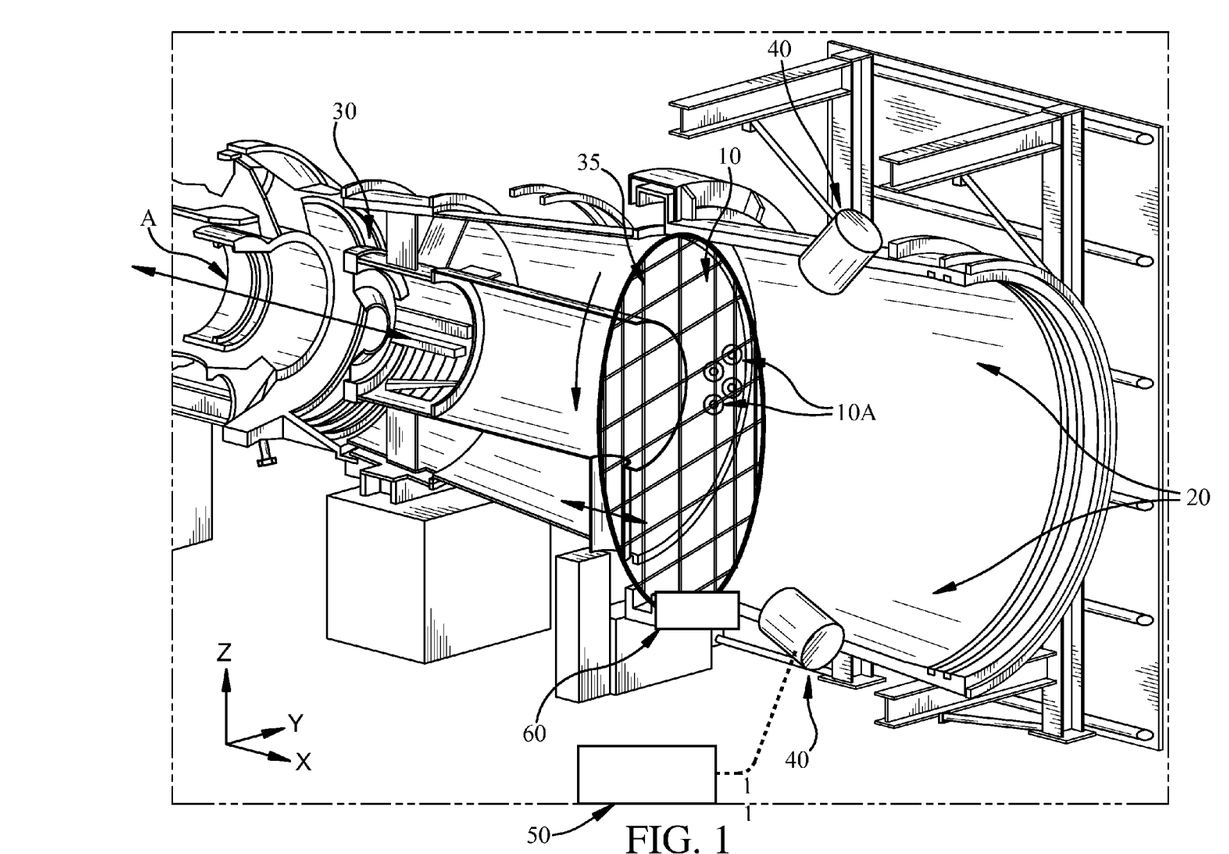
FIG. 1 illustrates a three-dimensional perspective view of a system according to embodiments of the invention.

Turning to FIG. 1, an isometric drawing illustrating a turbomachine exhaust temperature detecting system according to embodiments is shown. System 1 is illustrated and includes two-dimensional grid 10. Two-dimensional grid 10 may be constructed from filaments 35. Filaments 35 may be metallic or ceramic or other appropriate material. Two-dimensional grid 10 may include woven filaments to provide greater structural integrity. By woven, it should be understood that the filaments of the two-dimensional grid 10 may be strung like a tennis racket or a spider-web. The layout of the filaments of two-dimensional grid 10 may be disposed in other formats as well. According to aspects, two-dimensional grid 10 is sized to mount within exhaust path 20 of gas turbomachine 30. According to aspects, two-dimensional grid 10 may be adapted to rotate relative to a primary axis A of gas turbomachine 30. Also according to aspects, two-dimensional grid 10 may be adapted to move translationally along the primary axis A of gas turbomachine 30. Actuator 60 may move two-dimensional grid 10 in either or both the rotational directions and/or in translational directions, however aspects may include more than a single actuator to perform these movements. Actuator 60 may move two-dimensional grid 10 using belts, gears or other conventional apparatus (not shown) known in the art.

Figure 2:
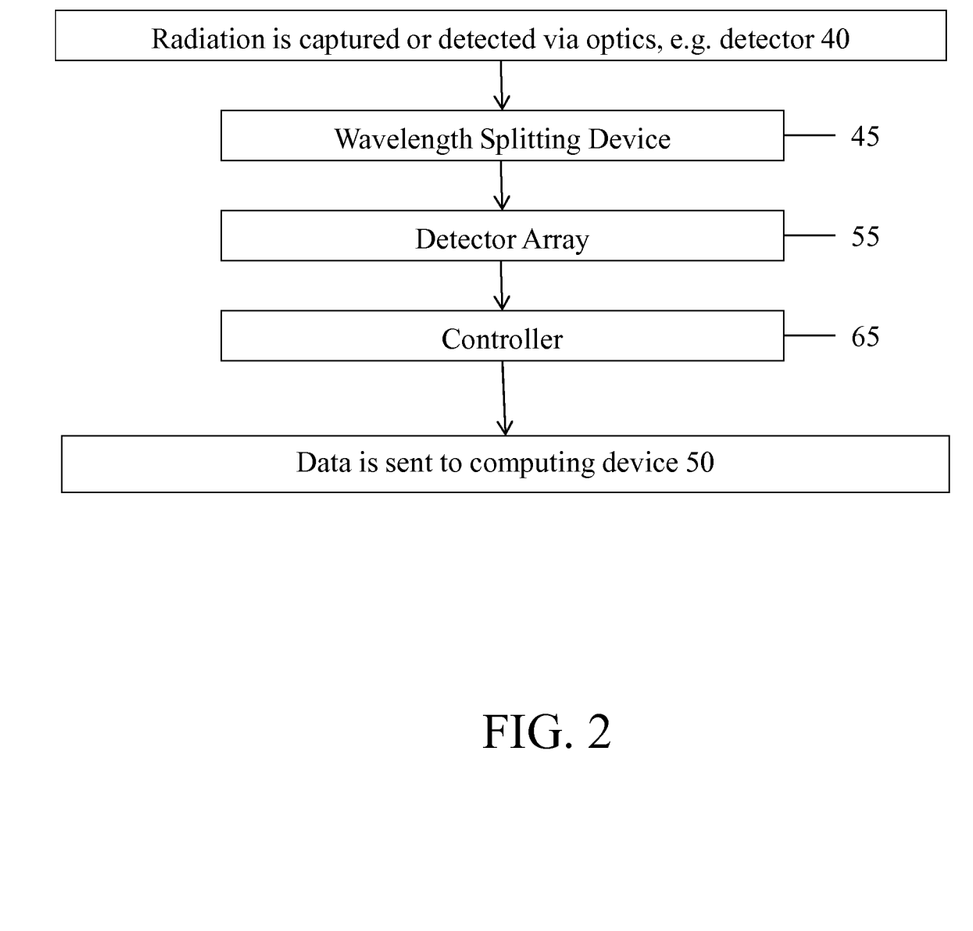
FIG. 2 illustrates an order of data input and output according to embodiments of the invention.

Radiation detection device 40 for detecting radiation and thereby indirectly measuring a temperature of exhaust from the gas turbomachine within the exhaust path at a plurality of points 10A on two-dimensional grid 10 is shown. Radiation detection device 40 detects radiation intensities emitted from the two-dimensional grid 10 at a plurality of points on the two-dimensional grid. Radiation detection device 40 may be mountable proximate the exhaust path and the two-dimensional grid 10. Radiation detection device 40 may include or be in communication with a wavelength splitting device 45 (FIG. 2) and/or one or more filters (not shown), one or more detector arrays 55 (FIG. 2), and one or more controllers (FIG. 2). FIG. 1 further illustrates computing device 50. According to aspects, at least one computing device 50 may be connected with radiation detection device 40. The at least one computing device 50 may be configured to generate a planar map 100 (FIG. 4) of the temperature of the exhaust from the gas turbomachine 30 based upon the intensity of the radiation emitted from two-dimensional grid 10 detected at the plurality of points 10A on the two-dimensional grid 10.

Computing device 50 may be configured to determine a performance parameter of the gas turbomachine based upon the planar map. Computing device 50 may further be configured to provide instructions to modify an operating parameter of the gas turbomachine based on the determined performance parameter of the gas turbomachine 30.

FIG. 2 illustrates an order of data input and output according to embodiments of the invention. As illustrated in FIG. 2, radiation is captured or detected through optics, for example by radiation detection device 40. A wavelength splitting device 45 may be used to split the detected radiation by wavelength (or frequency). A detector array 55 may be used to detect the radiation sent from the wavelength splitting device. A controller 65 may be used for data processing. Wavelength splitting device 45 may be used for splitting continuous broad wavelength bands of thermal radiation into at least one narrower wavelength band. Detection device 40 may include an infrared camera. Detection device 40 may further include a multi-colored pyrometry system. The detection device 40 may further include, or be in communication with a wavelength filtering device 45 sensitive to wavelengths of thermal radiation emitted from the grid which are not at least partially absorbed by an exhaust gas. Also, radiation detection device 40 may include or be in communication with wavelength splitting device 45 (shown in FIG. 3).

Figure 3:
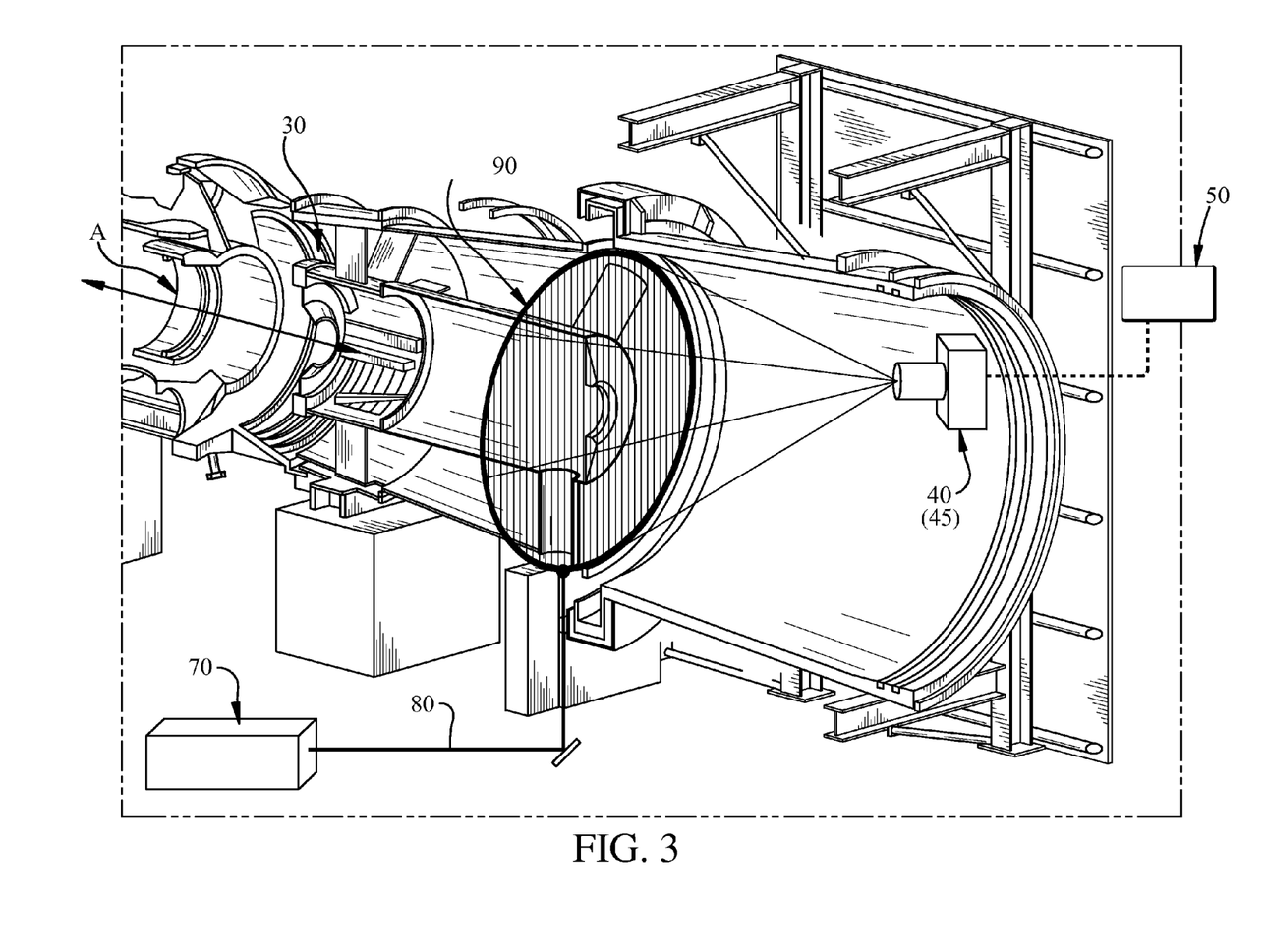
FIG. 3 illustrates a three-dimensional perspective view of a system according to embodiments of the invention.

FIG. 3 illustrates a system for Planar Laser Induced Fluorescence (PLIF) or for Filtered Rayleigh Scattering (FRS). The two-dimensional grid 10 shown in FIG. 1 is essentially replaced with a laser sheet 90. Laser sheet 90 may be created using laser system 70 and transmitted via laser delivery 80. Computing device 50 may perform an FRS analysis to create planar map 100 and/or computing device 50 may perform a PLIF analysis to create planar map 100 according to aspects of the invention.

As illustrated in FIG. 3, a light source such as laser system 70 for exciting gas molecules in a two-dimensional planar laser sheet 90 within an exhaust path of a gas turbo machine 30, is illustrated. According to embodiments as illustrated in FIG. 3, radiation detection device 40 may detect one of an intensity of scattered radiation from the gas molecules or an intensity of fluorescence radiation from the gas molecules. According to aspects, detection device 40 may be a Planar Laser Induced Fluorescence radiation detection camera device or a Filtered Rayleigh Scattering radiation detection camera device. Detection device 40 may be mountable proximate exhaust path 20 (shown in FIG. 1) and the laser sheet 90. One or more wide angle high intensity sheets of laser light may be projected in the exhaust path 20 from one or more ports to create a planar sheet 90 of laser light filling the exhaust plane as shown in FIG. 2. Radiation detection device 40 may include one or more intensified CCD (ICCD) cameras which may be mounted near or within the exhaust duct facing the laser plane in order to measure the intensity of scattered radiation from the gas molecules (or large scattering tracer particles artificially introduced in the gas turbine through combustion air) in the 2D imaging plane, to map temperature in the exhaust plane using the principles of Filtered Rayleigh Scattering (FRS).

According to aspects, one or more wide angle high intensity sheets of laser light may be projected in the exhaust plane, from one or more ports, to create a planar sheet of laser light 90 filling the exhaust plane as shown in FIG. 2. One or more suitable detector arrays 40 or cameras may be mounted near or within the exhaust duct facing the laser plane 90, in order to measure the intensity of fluorescent radiation from the gas molecules or fluorescent tracer particles (artificially introduced in the gas turbine through combustion air) in the 2D imaging plane to map temperature in the exhaust plane using the principles of Planar Laser Induced Fluorescence (PLIF). FIG. 3 illustrates computing device 50. Computing device 50 may be connected to the radiation detection device 40. Computing device 50 may be a plurality of computing devices 50. The at least one computing device 50 may be configured to perform one of a Filtered Rayleigh Scattering (FRS) analysis or a planar laser induced fluorescence analysis. The computing device 50 may be further configured to generate a planar map 100 of the temperature of the exhaust from the gas turbo machine 30 based on one of the (FRS) analysis or the planar laser induced fluorescence analysis. Computing device 50 may be configured to update the planar map 100 of the exhaust temperature based on light source 70 exciting gas molecules in a second two-dimensional plane within the exhaust path of the gas turbo machine 30 and the radiation detection device 40 may detect one of an intensity of scattered radiation from the gas molecules in the second two-dimensional plane or an intensity of fluorescence radiation from the gas molecules in the second two-dimensional plane. Computing device 50 may be configured to redetermine the performance parameter of the gas turbomachine 10 based upon the updated planar map. It should be understood that computing device 50 may be one of a plurality of computing devices working together.

According to aspects illustrated in FIG. 3, systems according to embodiments may include Radiation detection device 40 including a wavelength splitting device 45 (illustrated in FIG. 2) and/or one or more filters (not shown), one or more radiation detector arrays 55, (FIG. 2) and one or more controllers (FIG. 2).

Computing device 50 may be configured to determine a performance parameter of gas turbomachine 30 based upon planar map 100. The performance parameters may include exhaust temperature (2D map and/or planar average), power output, and total heat flux, or any other parameter associated with the performance of turbomachine 30.

Determining the performance parameter may allow for modification of an operating parameter. The operating parameters include total and combustion can level fuel flows, and inlet air flow. Computing device 50 may be configured to provide instructions to modify an operating parameter of gas turbomachine 30 based on the determined performance parameter. Modifying the operating parameter may enable greater efficiency of turbomachine 30.

FIG. 4 illustrates an exemplary planar map 100 of gas turbomachine exhaust temperature. Interpolated exhaust temperature is illustrated with hatching or shading to indicate relative high, medium, low and intermediate temperatures. As two-dimensional grid 10 is rotated, greater granularity of the map 100 can be produced, due to an increased number of detected points 10A on the grid 10 compared to keeping grid 10 fixed. Arbitrarily high resolution is possible in principle, because each point of the exhaust plane may correspond to co-ordinates of two-dimensional grid 10 at some point in time as two-dimensional grid 10 is rotated and as the temperature detecting device receives intensity data from each of the points 10A on two-dimensional grid 10.

Figure 5:
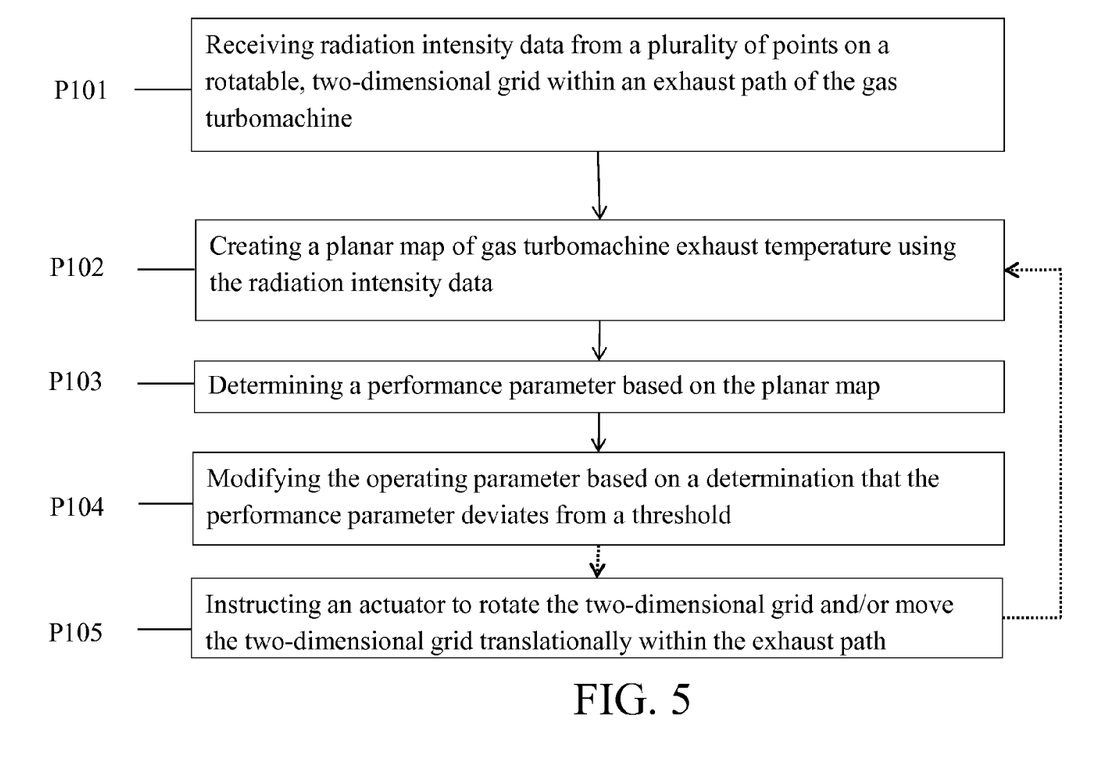
FIG. 5 shows a flow diagram illustrating an optional method process according to various embodiments of the invention.

FIG. 5 illustrates processes in a method for controlling an operating parameter of a gas turbomachine according to aspects of the invention. The method, according to aspects, may be encoded in a computer program product comprising program code embodied in a computer readable storage medium, which when executed, enables computing device 50 to implement the method for controlling an operating parameter of a gas turbomachine. Non-limiting examples of operating parameters include air flow and/or fuel flow. As illustrated in FIG. 5, process P10 includes receiving radiation intensity data from a radiation detection device 40 that detects the radiation intensity data from a plurality of points 10A on a rotatable, two-dimensional grid 10 within exhaust path 20 of the gas turbomachine. The radiation detector may receive continuous, broadband-wavelength thermal radiation emitted by a plurality of points on the two-dimensional grid within the exhaust path of the gas turbomachine via collection optics.

Process P102 includes creating a planar map of gas turbomachine exhaust temperature using the radiation intensity data. Creating the planar map 100 may be done by interpreting intensities of radiation detected at the plurality of points 10A on the grid 10, and interpolating temperatures, at non-measured co-ordinates in the measurement plane. Other detection means used in creating the planar map are discussed above.

Process P103 includes determining a performance parameter based on the planar map. The planar map can be analyzed to determine the current performance of the gas turbine and combustion system. This information can be reduced via a computer algorithm and thermodynamic models to modify operating parameters such as fuel flow, air flow or other controllable gas turbine parameters to optimize the gas turbine performance, as shown in process P104. Process P104 includes modifying the operating parameter based on a determination that the performance parameter deviates from a threshold.

Optional process P105 may be performed along with processes P101-P104 according to aspects. Optional process P105 includes instructing actuator 60 to rotate or translate the two-dimensional grid 10 within exhaust path 20. After performing process P105, the method may repeat step 102, creating an updated planar map 100 of gas turbomachine exhaust temperature using the temperature data. Updating the planar map 100 may result in greater granularity and resolution, as described above. After creating updated planar map 100 in the repetition of process P102, process P103 is repeated, specifically, redetermining the performance parameter based on the updated planar map. Then process P104, modifying the operating parameter based on a determination that the performance parameter deviates from the threshold, may be repeated. It should be noted that while process P105 includes rotating two-dimensional grid 10 and/or moving two-dimensional grid 10 translationally within exhaust path 20, i.e. either of the movements may be performed without the necessity of performing both. Moving two-dimensional grid 10 translationally may be performed in order to acquire temperature measurements in different planes, to provide a limited 3D volumetric map of temperature.

Figure 6:
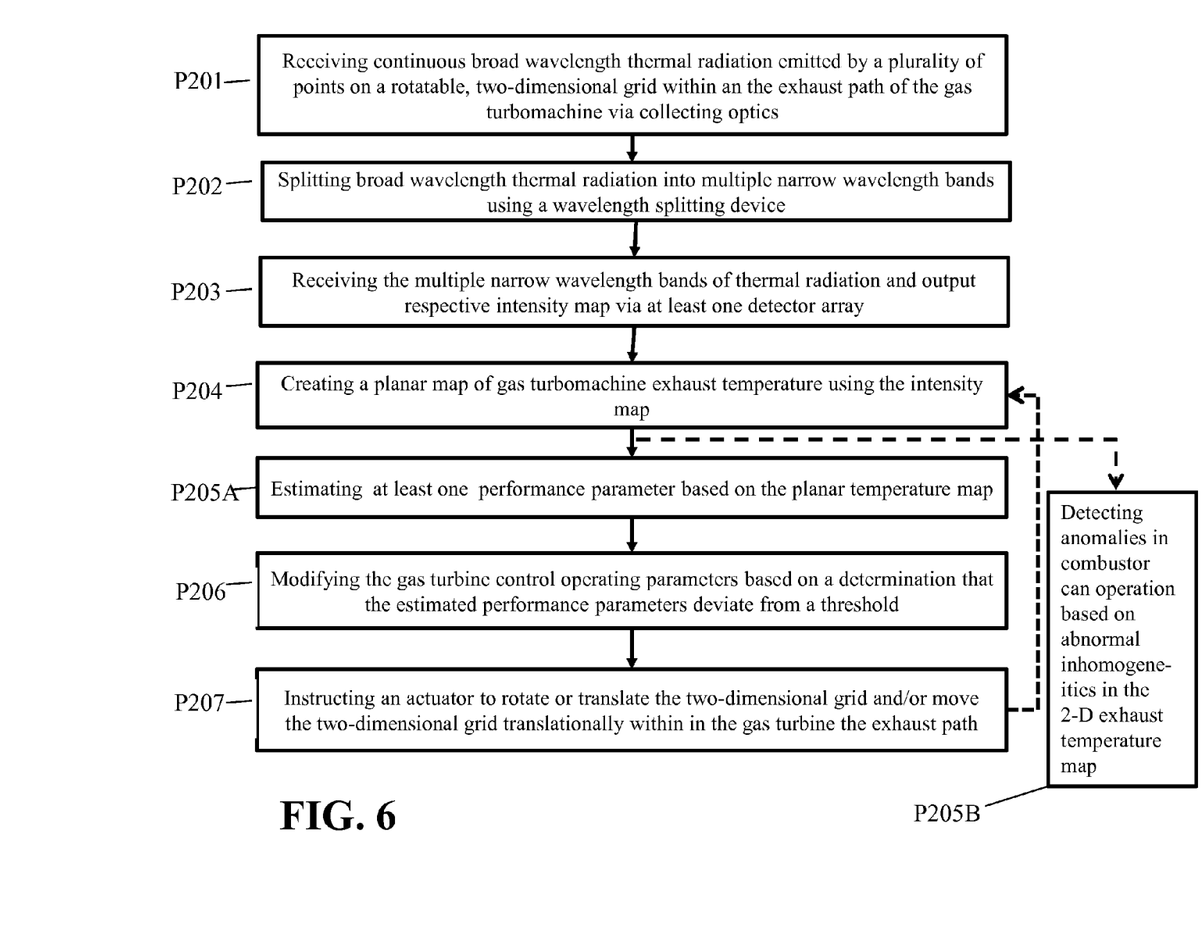
FIG. 6 shows a flow diagram illustrating an optional method process according to various embodiments of the invention.

FIG. 6 illustrates processes that may be performed in a method according to aspects of the invention. FIG. 6 illustrates process P201, which includes receiving continuous broad wavelength thermal radiation emitted by a plurality of points on a rotatable, two-dimensional grid within the exhaust path of the gas turbomachine via collecting optics. Process P202 includes splitting broad wavelength thermal radiation into multiple narrow wavelength bands using a wavelength splitting device. Process P203 includes receiving the multiple narrow wavelength bands of thermal radiation and output respective intensity map via at least one detector array. Process P204 includes receiving the multiple narrow wavelength bands of thermal radiation and output respective intensity map via at least one detector array. Process P205A includes Estimating at least one performance parameter based on the planar temperature map. Process P206 includes modifying the at least one gas turbine control operating parameter based on a determination that the estimated performance parameters deviate from a threshold. And process P207 includes instructing an actuator to rotate or translate the two-dimensional grid and/or move the two-dimensional grid translationally within in the gas turbine the exhaust path.

Optional process P205B may be performed to detect anomalies in the combustion can operation. According to aspects, the use of a 2D, planar temperature map may assist in deducing anomalies in combustor can operation via detection of 2D patterns in the exhaust temperature plane, e.g. abnormal inhomogeneity (ies) in the temperature map.

As used herein, the terms "axial" and/or "axially" refer to the relative position/direction of objects along axis A, which is substantially parallel with the long axis of the body of the turbomachine rotor. As further used herein, the terms "radial" and/or "radially" refer to the relative position/direction of objects along radius (r), which is substantially perpendicular with axis A and intersects axis A at only one location. Additionally, the terms "circumferential" and/or "circumferentially" refer to the relative position/direction of objects along a circumference which surrounds axis A but does not intersect the axis A at any location.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It is further understood that the terms "front" and "back" are not intended to be limiting and are intended to be interchangeable where appropriate.

Computing device 50 can comprise one or more general purpose computing articles of manufacture capable of executing program code, such that encoded with the method processes described with reference to FIGS. 3 and 4, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, program 362 can be embodied as any combination of system software and/or application software.

As used herein, the term "component" means any configuration of hardware, with or without software, which implements the functionality described in conjunction therewith using any solution, while the term "module" means program code that enables a computing device 50 to implement the actions described in conjunction therewith using any solution. When fixed in memory or a storage unit of a computing device 50 that includes a processing unit, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computing device 50.

When computing device 50 comprises multiple computing devices, each computing device may have only a portion of a program fixed thereon (e.g., one or more modules). However, it is understood that computing device 50 and any program for carrying out methods described herein are only representative of various possible equivalent computer systems that may perform a process described herein. To this extent, in other embodiments, the functionality provided by computing device 50 and programs encoding methods described herein can be at least partially implemented by one or more computing devices that include any combination of general and/or specific purpose hardware with or without program code, including but not limited to detection of temperatures of two-dimensional grids as discussed herein. In each embodiment, the hardware and program code, if included, can be created using standard engineering and programming techniques, respectively.

When computing device 50 includes multiple computing devices, the computing devices can communicate over any type of communications link. Further, while performing a process described herein, computing device 50 can communicate with one or more other computer systems using any type of communications link. In either case, the communications link can comprise any combination of various types of wired and/or wireless links; comprise any combination of one or more types of networks; and/or utilize any combination of various types of transmission techniques and protocols. In any case, the technical effect of the various embodiments of the invention, including, e.g., the computing device 50, is to measure planar temperature, e.g. in a turbomachine 30.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
   a two-dimensional grid sized to mount within an exhaust path of a gas turbomachine, wherein the two-dimensional grid is adapted to rotate relative to a primary axis of the gas turbomachine, or move translationally along a primary axis of the gas turbomachine, during operation of the gas turbomachine;
   a radiation detection device for detecting radiation emitted from the two-dimensional grid at a plurality of points on the two-dimensional grid, the radiation detection device being mountable proximate the exhaust path and the two-dimensional grid; and
   at least one computing device connected with the radiation detection device, the at least one computing device configured to generate a planar map of the temperature of the exhaust from the gas turbomachine based upon the intensity of the radiation emitted from two-dimensional grid detected at the plurality of points on the two-dimensional grid.

2. The system of claim 1, wherein the radiation detection device includes one of an infrared camera or a multi-color pyrometry system.

3. The system of claim 1, wherein the radiation detection device includes an optical system to collect light from the exhaust, the system further comprising a wavelength filtering device sensitive to wavelengths of thermal radiation emitted from the grid which are not at least partially absorbed by an exhaust gas.

4. The system of claim 1, further comprising:
   a wavelength splitting device for splitting continuous broad wavelength bands thermal radiation into at least one narrower wavelength band.

5. The system of claim 1, wherein the two-dimensional grid includes at least one of metallic filaments or ceramic filaments.

6. The system of claim 1, wherein the at least one computing device is configured to calculate the planar temperature map of the exhaust gases.

7. The system of claim 1, wherein the at least one computing device is configured to determine a performance parameter of the gas turbomachine based upon the planar map.

8. The system of claim 7, wherein the at least one computing device is configured to provide instructions to modify an operating parameter of the gas turbomachine based on the determined performance parameter of the gas turbomachine.

9. A computer program product comprising program code embodied in a computer readable storage medium, which when executed, enables a computer system to implement a method for controlling an operating parameter of a gas turbomachine, the method comprising:

receiving radiation intensity data from a plurality of points on a rotatable, two-dimensional grid within an exhaust path of the gas turbomachine, wherein the two-dimensional grid is rotatable during operation of the gas turbomachine, and the radiation intensity data is gathered during operation of the gas turbomachine;

creating a planar map of gas turbomachine exhaust temperature using the radiation intensity data;

determining a performance parameter based on the planar map; and modifying the operating parameter based on a determination that the performance parameter deviates from a threshold.

10. The computer program product of claim 9, wherein the method further comprises:

updating the planar map in response to one of: the two-dimensional grid being rotated or the two-dimensional grid being moved translationally within the exhaust path of the gas turbomachine, the rotation or the translation occurring during operation of the gas turbomachine.

11. The computer program product of claim 10, wherein the method further comprises:

redetermining the performance parameter based on the updated planar map; and modifying the operating parameter based on a determination that the performance parameter deviates from the threshold, wherein the operating parameter includes one of a fuel flow or an air flow of the gas turbomachine.

12. The computer program product of claim 9, wherein the temperature data are in a format generated by infrared technology.

13. The computer program product of claim 9, wherein the method further comprises:

collecting light from the excited gas molecules in the exhaust using an optical system to collect the light; and filtering the light by a wavelength filtering device sensitive to wavelengths of thermal radiation emitted from the grid which are not at least partially absorbed by an exhaust gas.

14. A system comprising:

a two-dimensional grid sized to mount within an exhaust path of a gas turbomachine, wherein the two-dimensional grid includes ceramic filaments, wherein the two-dimensional grid is adapted to rotate relative to a primary axis of the gas turbomachine, or move translationally along a primary axis of the gas turbomachine, during operation of the gas turbomachine;

a radiation detection device for detecting radiation emitted from the two-dimensional grid at a plurality of points on the two-dimensional grid, the radiation detection device being mountable proximate the exhaust path and the two-dimensional grid; and at least one computing device connected with the radiation detection device, the at least one computing device configured to generate a planar map of the temperature of the exhaust from the gas turbomachine based upon the intensity of the radiation emitted from two-dimensional grid detected at the plurality of points on the two-dimensional grid.

15. The system of claim 14, wherein the radiation detection device includes one of an infrared camera or a multicolor pyrometry system.

16. The system of claim 14, wherein the radiation detection device includes an optical system to collect light from the exhaust, the system further comprising a wavelength filtering device sensitive to wavelengths of thermal radiation emitted from the grid which are not at least partially absorbed by an exhaust gas.

17. The system of claim 14, further comprising:

a wavelength splitting device for splitting continuous broad wavelength bands thermal radiation into at least one narrower wavelength band.

18. The system of claim 14, wherein the at least one computing device is configured to calculate the planar temperature map of the exhaust gases.

19. The system of claim 14, wherein the at least one computing device is configured to:

determine a performance parameter of the gas turbomachine based upon the planar map; and provide instructions to modify an operating parameter of the gas turbomachine based on the determined performance parameter of the gas turbomachine.

* * * * *